INVENTORS
RICHARD L. MACH
EDWARD STUDLEY
THOMAS W. HAAS

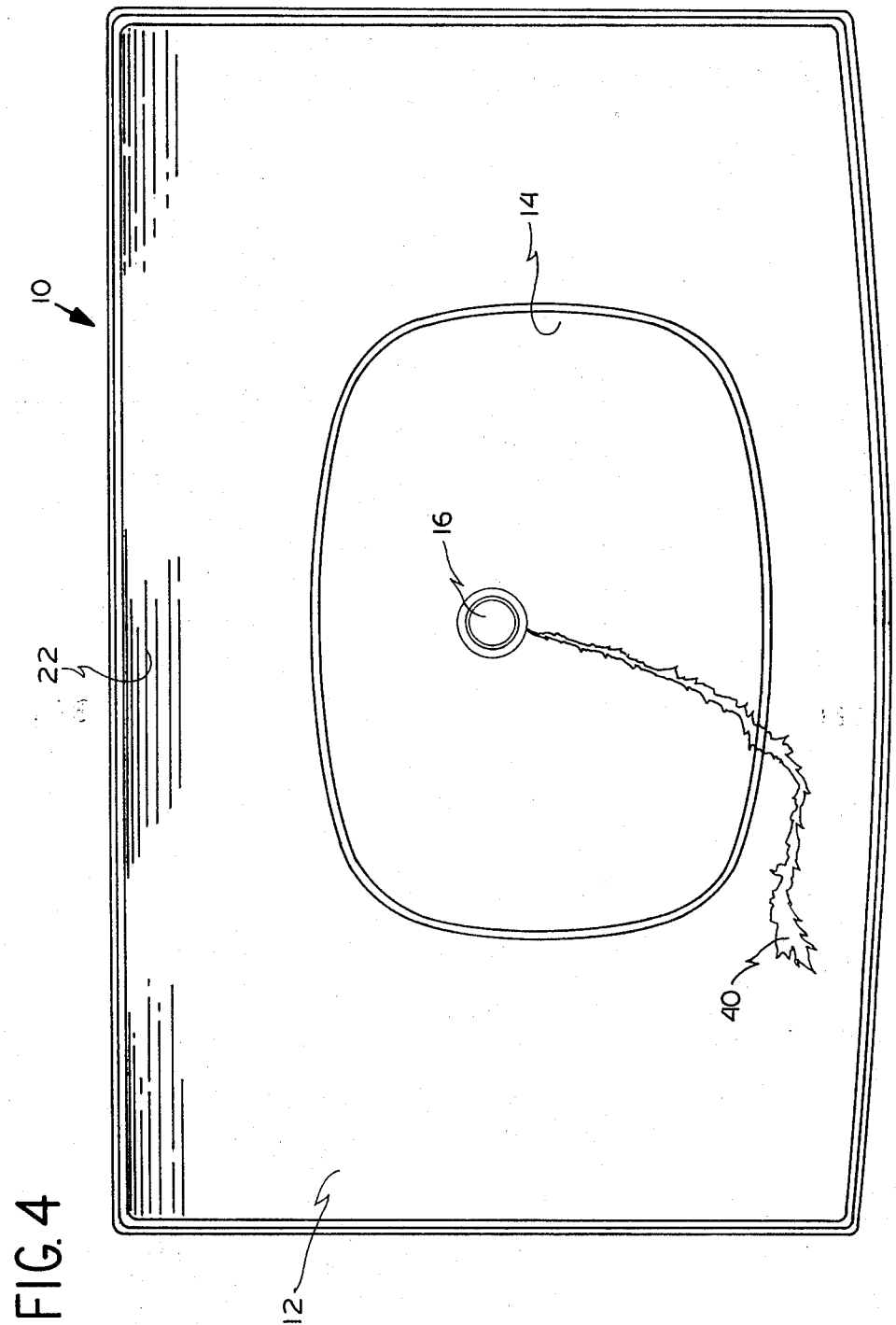

United States Patent Office 3,766,186
Patented Oct. 16, 1973

3,766,186
PLASTIC MOLDING PROCESS
Richard L. Mach, Piscataway, Edward Studley, North Plainfield, and Thomas W. Haas, Watchung, N.J., assignors to American Standard Inc., New York, N.Y.
Filed Mar. 3, 1971, Ser. No. 120,642
Int. Cl. B29c 3/00
U.S. Cl. 264—269
7 Claims

ABSTRACT OF THE DISCLOSURE

An improved molding process for molding complex surfaces is provided comprising charging a mold cavity with a thermosetting, polymerizable resin, subjecting said resin to pressure and temperature sufficient to mold said resin in conformity with said mold cavity and to partially cure said resin to form a dimensionally stable, partially cured article having complex surfaces, removing at least a portion of the flashing from said molded article, placing discrete masses of a thermosetting, polymerizable resin upon said complex surfaces so that upon application of pressure said resin flows, forming a liquid resin wave front which drives gases and vapors from said mold cavity as said wave front advances with increasing pressure.

---

This invention relates to an improved molding process for molding articles of complex shape. More particularly, this invention relates to a dual compression molding process for uniformly applying a glazing compound to a partially cured article of complex configuration.

A wide variety of compression molding methods have heretofore been employed to produce coated plastic articles. For example, efforts have been made to apply a layer of plastic resin to one surface of a mold cavity and to apply over this surface a layer of a second dissimilar plastic resin or a different colored plastic resin. However, such efforts have failed to consistently produce uniformly coated articles because of the difficulty in controlling the movement and flow of plastic resins during the compression step. Another method for molding two-color plastic articles involves the use of two different compression die members, the second die member being of a slightly different size from the first and being employed to mold the second color on top of the base molding formed by the first die member. While such a process produces uniformly coated articles, the process is not economical especially for large molds such as used to make lavatories because two different die members are needed both requiring very accurate positioning resulting in an expensive molding operation. A further method which has proven fairly satisfactory for relatively flat or contoured articles such as dishes is to reverse the conventional position of the molding dies so that the male die is mounted on the bottom of the press and the female die is mounted in the vertically reciprocal position in the press. Such method has been asserted to produce uniform two-toned, molded articles. However, such a process is not satisfactory for the production of a steep-sided article because "pinch-off" occurs due to the geometry of the mold thereby causing non-uniformly coated articles to be produced.

"Pinch-off" is a problem arising in the molding of articles having steep or relatively steep sidewalls, because the flow of resin is not uniform in all directions and further, the resin tends to become more viscous and set up as it flows over the hot surface. The problem is primarily manifested in the molding of steep-sided plastic articles particularly where the angle at which the steep-side intersects the vertical plane is in the range of 3° to 20°. The problem is even more acute where the length of the steep-side is equal to or greater than about 1½ times the dimension of the adjacent molded top or bottom of the article. Formerly, heated preformed masses of glazing compound were normally placed on a horizontal surface of the molded article. It is readily apparent that the sidewalls of the molded article to be coated, either exteriorly or interiorly, are closely proximate to the corresponding surface of the upper die member at the time said upper die member compresses the preformed glazing compound sufficiently to cause said compound to liquefy and flow. This problem is particularly acute in situations where the included angle approaches the minimum 3° angle and where the length of any substantially vertical is significantly greater than the length of the adjacent molded top or bottom. Thus, the problem resides in the geometry of steep-sided articles and results from the placement of the resin preform on a horizontal surface of the mold cavity.

In copending application Ser. No. 815,934 entitled "Improved Plastic Molding Process" by Alfred Shaines, filed Apr. 14, 1969, now U.S. Pat. 3,597,425, and assigned to the same assignee herein, there is described a dual compression molding process for coating articles having almost vertical surfaces which comprises the steps of preheating a mold having a steep-sided cavity therein to at least 200° F., placing a thermosetting resin in the open mold, closing said mold with a top force thereby applying pressure to said resin for a period sufficient to form a partially polymerized base molding, opening said mold, placing at least one preform of a dissimilar thermosetting resin on a nearly vertical surface of said base molding, closing said mold with said top force, thereby compressing said preform and closing said preform resin to liquefy and flow over the surface of said base molding to form a coating thereon and opening said mold to remove said coated article therefrom. In such a dual molding process, the "pinch-off" problem is obviated by the step of placing at least one heated preform of the thermosetting glazing compound on the steep-sided or substantially vertical surface of the article to be coated. Such placement of the preform brings it into contact with the top compressive die member at a time when the sidewall to be coated and the corresponding surface of said upper die member are still sufficiently far apart to assure substantially free flow of the liquid resin over the surface to be coated. This method works reasonably well if the preforms of glazing compound are placed in closely defined locations over the surface of the molded article. It has been found, however, that this method frequently results in numerous surface imperfections. These imperfections are manifested as fern-like or dendritic structures referred to herein as "Christmas trees."

In the manufacture of glazed fixtures, the glaze is required to provide resistance to abrasion, staining and cigarette scorch as well as to impart the high gloss considered desirable for such fixtures. Thus, the nature of the glazed surface is of critical importance since any defect therein would materially detract from the appearance of the fixture and any repair required would substantially increase manufacturing costs.

Accordingly, it is an object of this invention to provide an improved molding process to obtain a substantially defect-free glazed fixture.

It is another object of the present invention to provide an improved molding process adapted to impart a uniform coating of glaze to an article exhibiting a complex surface configuration.

It is still another object of the present invention to provide an improved dual-compression molding process employing the glazed pill technique wherein a molded article is obtained exhibiting a uniform coating of glaze thereon substantially free of surface imperfections.

These as well as other objects are accomplished by the present invention which provides an improved molding process for molding articles of complex shape exhibiting both planar and curved surfaces which tend to entrap vapors during the molding thereof, comprising charging a mold cavity with a thermosetting polymerizable resin, subjecting said resin to pressure and temperature sufficient to mold said resin in conformity with said mold cavity and to partially cure said resin to form dimensionally stable, partially cured article exhibiting both planar and curved surfaces, releasing the pressure on said molded article, placing discrete masses of a thermosetting, polymerizable glazing compound upon substantially vertical surfaces of any curved surfaces of said article and upon the planar surfaces such that upon application of heat and pressure said glazing compound flows forming a liquid wave front which drives gases from said mold cavity as said wave front advances with increasing pressure.

The invention and its advantages will become more apparent from the following detailed description with reference to the accompanying drawings wherein:

FIG. 4 is a plan view of a typical lavatory countertop illustrating the consequences of failure to remove sufficient drain flash to permit escape of the gases and vapors swept by the liquid wave front formed in accordance with the present invention.

Figure 1:
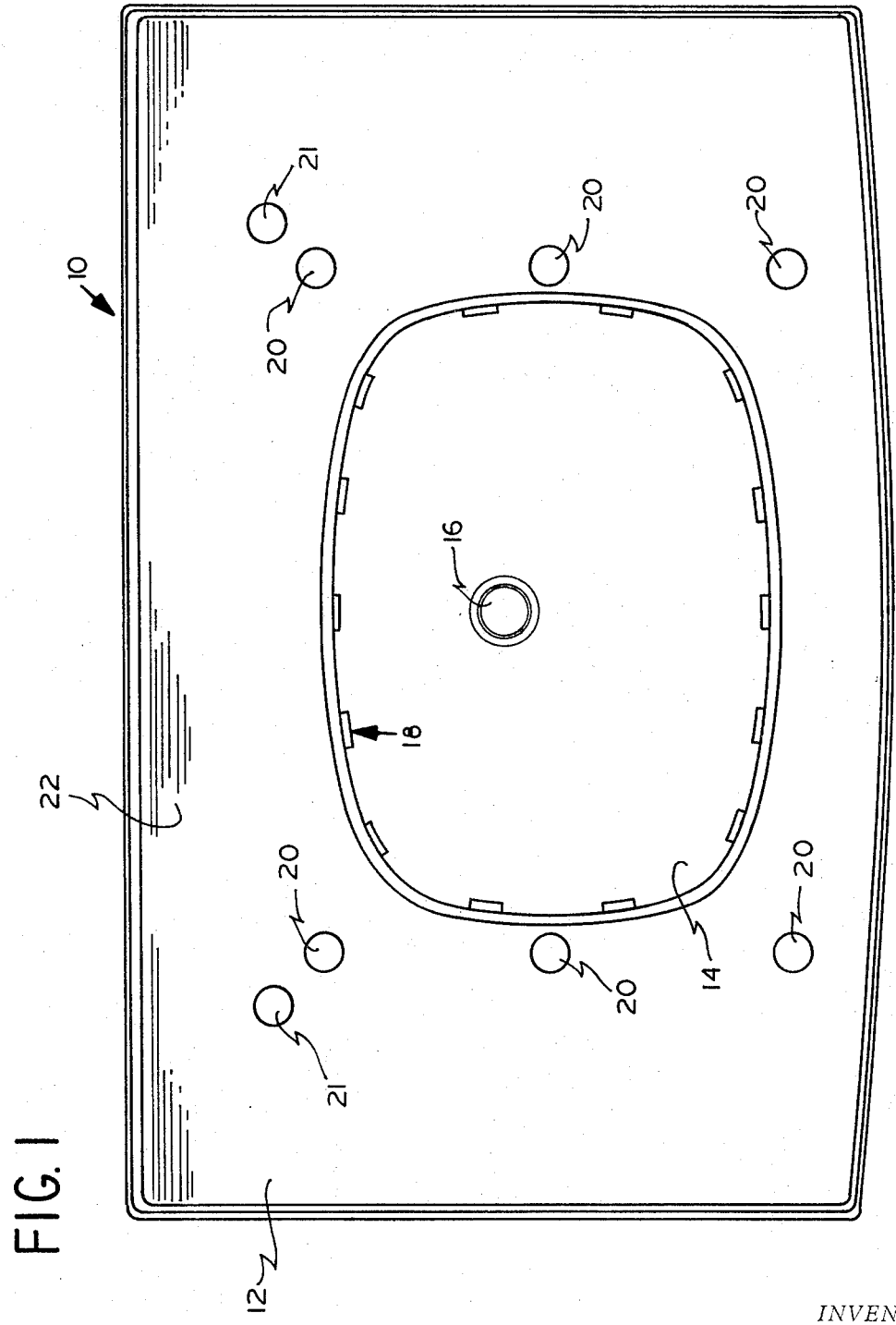
FIG. 1 is a plan view of a typical lavatory countertop illustrating the positioning of discrete masses of glazing compound in accordance with one embodiment of the present invention.

The dual compression process employed in the present invention comprises a first compression step wherein a polymeric powder or a preform thereof is compressed and partially polymerized to form a base molded article. The first compression step is conducted for a period of time sufficient to yield a base molding having a surface hardness capable of withstanding the second compression step, but insufficient to cause the polymer to completely polymerize and harden. If the surface of the base molding is too soft, distortion may occur during the second compression step; whereas, if the surface of the base molding is too hard, i.e., completely polymerized, cracking may occur or the surface may not laminate properly with the glaze coating to form a solid, integral coated article. To achieve the proper "partial-set" the molding time, the molding temperature and the compression force must be carefully adjusted relative to the type of polymer employed and the geometry of the desired product. In the second compression step preformed discrete masses or pills of a thermosetting, polymerizable glazing compound of a different composition, color or type from the base polymer are affixed upon substantially vertical surfaces or steep sides of any curved surfaces of said base molding and upon the planar surfaces of said base molding of said curved surfaces and compressed and heated and caused to liquefy and flow over the surface of the base molding forming a liquid wave front of glazing compound which drives or sweeps gases from the surface of said base molding as said wave front advances with increasing pressure thereby forming a substantially uniform coating of glazing compound on the base molding.

The glazing procedure heretofore employed to apply a coating of glazing compound to a complex surface, such as a lavatory countertop unit comprising an integrally molded sink and countertop was to simply distribute the number of pills of glazing compound required to obtain a desired thickness uniformly over the lavatory surface. However, as stated hereinabove, this method often resulted in Christmas trees and other surface defects. Although not wishing to be found by any theory or mechanism, it has been found in this invention that when pills of glazing compound are uniformly distributed over the lavatory surface, Christmas trees tend to form at the flow interface of the pills. Accordingly, it is currently believed that the Christmas trees arise owing to the entrapment of the air, water vapor, formaldehyde and other gases during the flow of the uniformly distributed pills. Thus, in accordance with the present invention, the entrapment of such vapor during the molding process is substantially reduced or eliminated by placing the pills of glazing compound on the lavatory surface in such a manner as to rapidly generate or form a continuous wave front of liquid glazing compound prior to substantial gas or vapor generation so that the gases which are occluded on or generated at the mold surface are driven or swept out as the wave front advances. The placement and flow of the pills as well as the establishment of the liquid wave front is dictated by the movement of the mold force relative to the lavatory surface. It is also considered critical in the present invention that the mold design be such that it cooperates with the advancement of the wave front of liquid glazing compound to allow for the escape of the swept gases from the mold.

Referring now to the drawing, there is shown in FIG. 1 a typical lavatory unit 10 comprising a countertop 12 and an integrally molded sink 14 terminating in a drain 16. The drain 16 serves two purposes; it provides an outlet through which some of the gases and vapors generated during the glazing process can escape and, by applying compressed air to it, it serves as a means for removing the resulting molding from the mold. It is considered important in the present invention that after the first compression step sufficient flash left at the drain 16 or along the sides of the countertop 12 be removed prior to commencing the second compression step to enable escape of the gases and vapors driven from the mold by the advancing liquid glaze wave front.

Typically, the mold which can be employed in the present invention comprises a female die member and a male die member. The male die is mounted upon or attached to the upper platen of a press and is normally adapted to reciprocate vertically. The female die forms the base or cavity of the mold. The male die is so dimensioned that a cavity corresponding with the desired lavatory unit will be formed between itself and the female die member when the male die member is lowered into the female die member.

In the first compression step, the mold members are preheated to a temperature of at least about 200° F. and preferably of about 280° to about 380° F. by passing high pressure steam or heated oil through conduits contained within the die members. Alternatively, the mold may be heated by an electric heater or gas flames or other conventional heating means. A thermosetting resin in an amount sufficient to more than fill the mold cavity is charged to the female die member base of the mold. The molding resin can be in particulate form or can be employed as a preform. The molding resin is preferably preheated to a temperature in the range of about 150° F. to about 300° F. to reduce the molding time and to enhance the dimensional stability and physical properties of the molded articles. Preheating of the molding resin can be accomplished in a hot air oven, by infrared heating, by dielectric heating, or other convenient heating methods. Generally, dielectric heating methods are considered the most efficient and effective.

When the male die member is lowered to close the mold and the pressure is increased to the range of from about 1,000 to about 12,000 p.s.i.g., the particulate or preformed resin within the mold liquefies due to the heat and pressure and fills the mold cavity with liquid polymer which polymerizes to a viscous liquid and then to a hard solid. The excess molding resin flows up the steep side of the sink portion 14 and then laterally across the counter portion 12 through narrow openings between the terminal flanges of the female and male dies to form a flashing which encircles the periphery of the cast article. This flashing can be removed in any suitable manner, such as by grinding. Pressure is maintained on the resin within the mold for a period sufficient to form a partly polymerized base molding, having sufficient surface hardness to withstand the second compression step without distortion. The time required to obtain a properly "partially cured" base molding is determined by properly adjusting the preheat temperature, molding time, molding temperature, and the thickness and the geometry of the article to be produced. At the expiration of the compression period, the mold is opened by returning the male die member to its original position.

After the completion of the first compression step, a "partially set" lavatory article is obtained comprising a countertop portion 12 integral with a sink portion 14, said sink portion 14 terminating in a drain 16.

After completion of the first compression step, heated preformed pills 18 of a thermosetting resin having different characteristics than the base molding resin, for example, a different resin or the same resin having a different color or with different additives, are pressed against the substantially vertical surfaces of the sink portion 14 of the molded article. Prior to insertion, the preformed pills of glazing material 18 can be preheated to reduce the molding time. The amount of resin contained in the aggregate number of pills 18 is more than sufficient to overfill the sink portion 14 of the mold cavity. In order to prevent the pills 18 from being wiped off the substantially vertical surface of the sink 14 as the male die descends into the female cavity, the pills should be situated high up on the side of the sink cavity and the thickness of the pills should be such that the male die will not touch said pills until the male die is quite far into the cavity. Additional preformed pills 20 of the same composition as pills 18 are placed on the planar surface forming the counter portion 12 proximate on the lavatory article 10 in regions of said counter 12 proximate the substantially vertical surfaces of the sink 14. In this manner, upon application of heat and pressure, the pills will liquefy and flow and merge together rapidly to form a continuous liquid wave front prior to substantial generation of vapors and gases by the pills thereby avoiding entrapment of said vapors and gases by the merging liquids which has heretofore given rise to Christmas tree formation. This causes gases to be driven from said mold cavity as said wave front advances in such directions with increasing pressure. Within the sink portion 14 of the lavatory article 10, the gases are driven in advance of the glaze wave front toward the drain 16 where said gases escape from the mold. The pills 20 situated on the counter 12 liquefy upon increasing heat and with increasing pressure flow radially out towards the edges of the counter 12 along with the excess glazing compound flowing out of the sink portion 14. The gases which are driven in front of the resulting liquid glaze wave front are pushed out and escape through the side lands of the mold.

During the second compression step, the mold is maintained in a closed position for a period sufficient to set the relatively thin layer of glazing compound on to the base molding. Generally, the die is maintained under pressure from about 10 to about 600 seconds, preferably from about 30 to about 150 seconds. At the conclusion of the second compression step, the male die member is released and the molded plastic article exhibiting a uniform coating of glaze therein is removed from the mold using conventional knockout pins.

After the flashing has been removed by conventional means, e.g., sanding belt, by hand or otherwise, the resultant molded article exhibits a thin uniform coating of dissimilar resin over the whole of its surface. The thickness of the coating may vary with its particular requirements such as its color hiding power, its abrasion, staining or cigarette scorch resistance, and the like. Generally, the thickness of the coating ranges from about 0.5 to 10 mils thick. Preferably the coating thickness is about 2 mils. At thicknesses substantially in excess of 2 mils, the glaze tends to craze whereas coating thicknesses substantially less than 2 mils tend to wear off. The coating is substantially uniform but may vary somewhat in accordance with the angle at which the surface being coated intersects the vertical plane, with the thickness decreasing as the included angle decreases.

Figure 2:
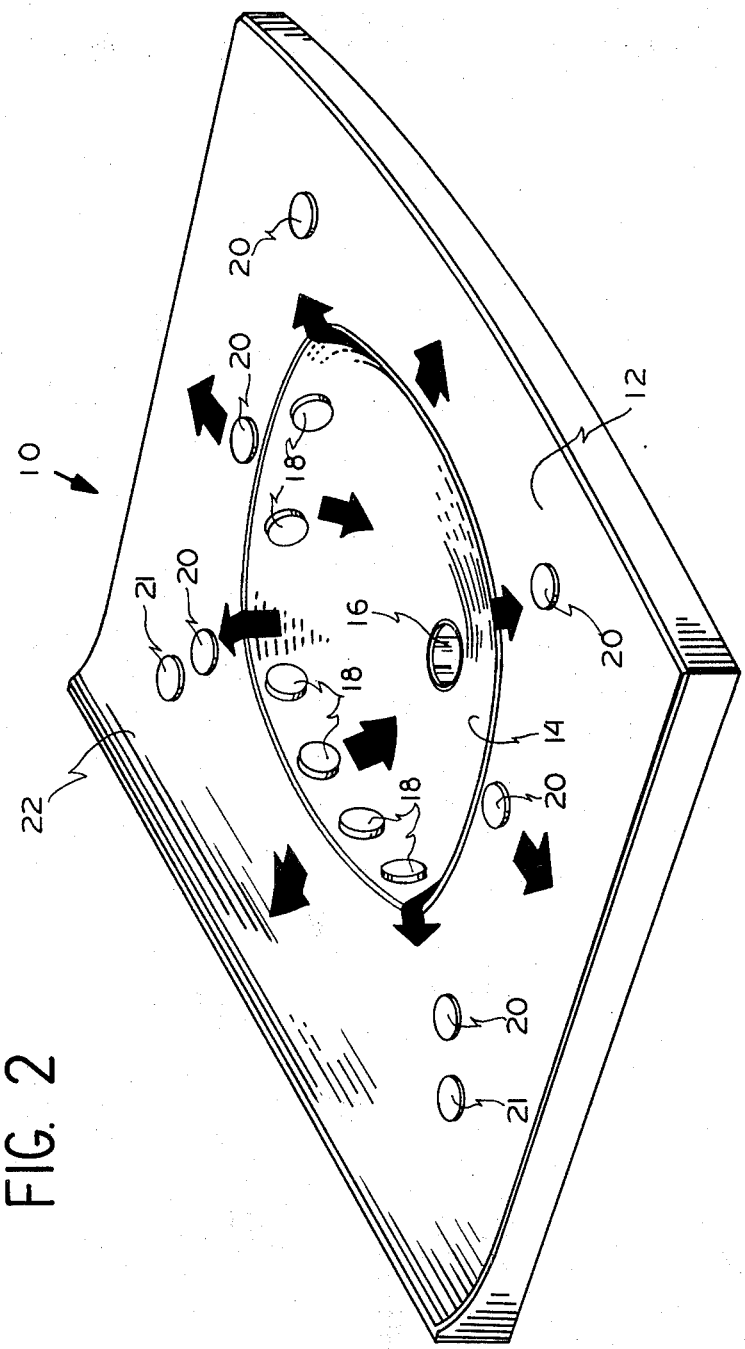
FIG. 2 is an isometric view of the lavatory countertop illustrating the placement of the discrete masses of glazing compound when liquefied under heat and pressure.

As shown in FIG. 2, as the male member descends into the female cavity during the second compression step, the preformed pills of glazing compound begin to melt and flow in the directions indicated by the arrows. It is considered preferable in this invention that prior to commencement of the second compression step sufficient flashing be removed from the mold aperture, namely, at the drain 16 and/or at the flanges along the edges of the counter 12 so that air or other generated vapors can be swept out of the mold cavity by the advancing liquid wave front formed by the molten glazing compound. As shown by the arrows, the glazing pills situated on the steep walls of the lavatory initially flow in a downward direction sweeping vapors in front of the wave front which forms and out the drain 16. Since the volume of the liquid glazing compound is in excess of the volume required to fill the mold cavity of the lavatory portion of the mold, the excess glazing compound flows upward and out of the lavatory portion on to the horizontal lavatory countertop 12 in the area of intersection of the steep sidewalls of the lavatory with the planar countertop surface. The excess glazing compound emerging from the lavatory rapidly merges and blends with the radially spreading wave front formed by the molten glaze pills situated on the lavatory countertop surface proximate the steep sidewalls. This radially extending wave front sweeps all vapors in front of it out the end walls or flanges of the mold cavity to produce a substantially uniform glazed surface on the entire molded article.

The glaze pills are situated upon the lavatory countertop surface in regions substantially proximate the steep sidewalls of the sink portion of the lavatory, such that upon application of pressure the glazing compound flows rapidly forming a liquid wave front which drives gases from the mold cavity as said wave front advances with increasing pressure. As shown in FIG. 2, the placement and number of pills on the lavatory countertop surface 12 should be such that a uniform coating of the entire surface is obtained, care should be taken in this regard to position additional pills 21 to compensate for larger land areas or changes in curvature. Such regions require additional glazing compound to cover the additional surface area and to provide the necessary impetus to overcome gravitational forces and flow uphill. Thus, additional pills of glazing compound 21 are required in the back stop region 22 on the lavatory countertop 12. Less assistance is obtained in this region from the overflow of the molten glazing compound from the lavatory because the back region of the lavatory is deeper and therefore larger than the front portion, thereby consuming a larger proportional amount of the glazing compound situated on the posterior sidewalls of the lavatory than the front walls thereof. In addition, additional pills are required in said back stop region to compensate for the curvature of said back stop 22. It is considered critical, however, to the obtainment of a substantially defect-free glaze that these additional pills 21 be situated proximately to pills 20 which are proximate to the steep sidewalls of the sink portion of the lavatory. Such placement enables the respective pills to flow and rapidly merge due to their proximity before substantial evolution and thus entrapment of gas and vapors can occur. Although the specific placement shown in FIG. 1 is considered preferable for the molding and glazing of integrally formed lavatories and lavatory countertops, the guidelines set forth herein enable the obtainment of a uniform coating on any similarly molded plumbing fixture.

Figure 3:
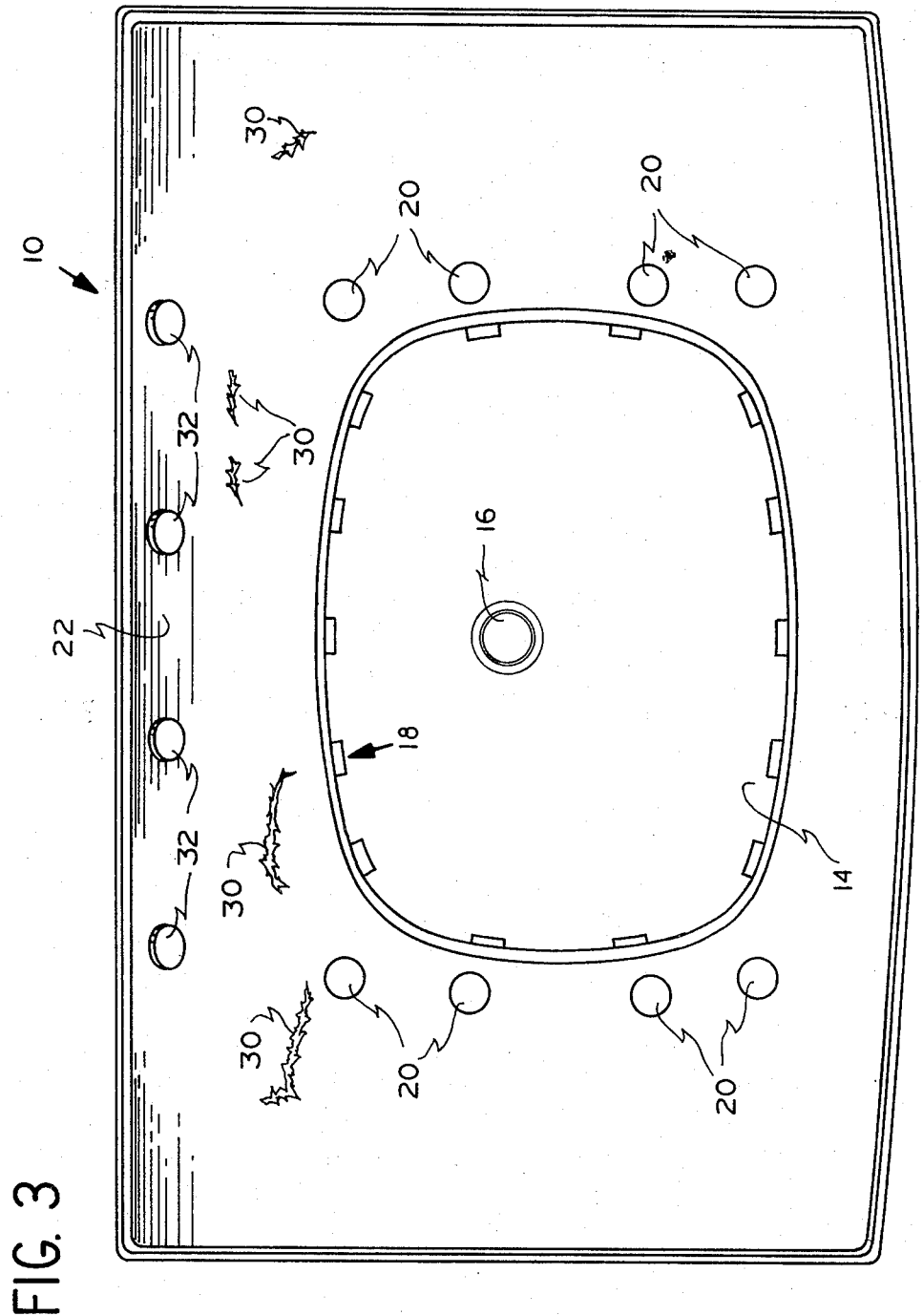
FIG. 3 is a plan view of a typical lavatory countertop illustrating the consequences of improper placement of the discrete masses of glazing compound.

As shown in FIG. 3, Christmas tree defects 30 arise when pills 32 are placed a relatively long distance away from pills 20 which are proximate the steep sidewalls 14 of the lavatory. The wave front emerging from the steep sidewalls of the lavatory rapidly merges with the molten pills on the countertop in the region proximate the steep sidewalls of the sink and the resultant dynamic wave front flows radially out coating the countertop and sweeping occluded gases and generated vapors out of the mold as it advances. The wave front generated by the pills along the back stop region 22 travels in a direction relatively opposite that of the main wave front. The distance between the two opposing wave fronts is sufficiently great that occluded and generated gases and vapors are entrapped between the two wave fronts essentially precluding complete merger thereof and thus giving rise to Christmas tree defects in the glaze coating.

FIG. 4 illustrates the generation of a Christmas tree defect 40 attributable to the failure to remove sufficient flash in the drain 16 after the initial molding operation. During the glazing operation, the pills situated along the steep sidewalls form a continuous glaze wave front forcing gases in its advance down and out the drain. In this instance, however, insufficient flash was removed to permit the egress of the swept vapors and gases with the result that the gases and vapors are trapped and compressed and ultimately flow out of the sink giving rise to a large Christmas tree 40.

Various types of thermosetting, polymerizable resins may be used in practicing the process of the present invention. Generally, suitable thermosetting polymerizable resins include resins of the following kinds or types: phenolic resins, e.g., phenol formaldehyde resins, polyester resins such as resins derived from dially phthalate, epoxy resins, alkyd resins, allylic resins, urea resins, and melamine resins. Also suitable are the mixtures or blends formed by adding chemicals, fillers or reinforcing materials to resins of the foregoing types. In general, the properties or characteristics desired in the resultant plastic article determine the choice of the resin type. For example, phenolics exhibit good chemical, water, and heat resistance and have good electrical insulating properties; epoxies are resistant to strong acids, alkalies and solvents and have high tensile, compressive and flexural strength; and melamine resins are resistant to flame and electrical arcing.

In addition, the properties of the thermosetting polymerizable resins may be modified by including filers therein. For example, fiber glass has been used to reinforce polyester, epoxy and phenolic resins. Similarly, asbestos has been used to modify phenolic, polyester, epoxy, melamine and silicone resins to improve resistance to acid and alkalies. Sisal, cellulose and synthetic fibers, such as nylon, have also been used to reinforce the polymerizable resins. Generally, the polymerizable resins modified with fillers are stiffer or more viscous and require the use of higher molding pressures.

The present invention is further illustrated by the following example. Unless otherwise stated, all percentages and parts are by weight.

EXAMPLE 16.5 pounds of cellulose filled melamine powder are preheated to about 200° F. The preheated powder is charged to the open cavity of a compression mold designed to form an integrally molded lavatory and lavatory countertop, such as shown in FIG. 2. The mold is closed for two-and-a-half minutes at 290° to 295° F. under 1,750 tons of force. The mold is then opened exposing the partially polymerized base molding 22. Unfilled melamine "glaze" pills, approximately one inch in diameter by ⅛ inch thick and weighing 2 grams each are placed on the base molding in substantially the position shown in FIG. 1. 14 pills are placed around the perimeter of the lavatory on the sidewalls thereof, proximate the top. The remaining 8 pills are placed upon the horizontal countertop proximate the edge of the lavatory as shown in FIG. 1. Flashing is removed from the drain and lateral edges of the countertop providing a means of egrees for vapors generated during the subsequent molding operation. The mold is then closed for an additional two minutes to enable the melamine glaze to flow out and completely cover the surface. As the mold closes, the male die member first encounters the glaze pills on the lavatory sidewalls and directs the flow of the liquid wave front which forms both down into the bottom of the bowl and out toward the countertop edge. In the bowl, the gases are pushed in advance of the glaze front toward the drain where they escape from the mold. When the pills situated on the countertop surface encounter the force of the male die member, they liquefy and merge with the excess liquid glaze emerging from the bowl as they flow radially out toward the countertop edge. The gases which are pushed out in advance escape at the side of the mold at the flanges thereof. The pressure is then released and the mold opened. A uniformly glazed lavatory unit essentially free of surface defects is recovered.

What is claimed is:

1. A method of forming a resin glaze on the upper face of a lavatory, wherein the lavatory comprises a one piece plastic molding configured to include a bowl having a rear wall, front wall, two sidewalls, bottom wall, and drain opening in the bottom wall; said plastic molding further comprising a countertop extending outwardly from the rim of the bowl completely therearound to define a rear countertop section, two side countertop sections, and a front countertop section:

said method comprising the steps of placing at least one resin pill on each one of the bowl rear wall, sidewalls, and front walls;

locating each resin pill high up on the respective bowl wall in close proximity to the bowl rim, such placement enabling the respective pills to flow and merge, due to their proximity, before substantial evolution and thus entrapment of gas and vapors; and moving a heated male die member against the resin pills to cause liquid resin to flow downwardly toward the drain opening and also upwardly onto the countertop forming liquid resin wave fronts which drive gases and vapors from the cavity as said wave fronts advance with increasing pressure of the die member.

2. The method of claim 1 wherein approximately fourteen resin pills are placed on the bowl walls.

3. The method of claim 2 wherein the resin pills are evenly spaced around the bowl surface.

4. The method of claim 1 wherein each resin pill consists of a resin disc having a thickness of about one-eight inch and a diameter of about one inch.

5. The method of claim 1 wherein the bowl has a generally oval plan configuration, and the countertop has a rectangular plan configuration: said method comprising the further step of placing additional resin pills on the countertop in the areas between the countertop corners and the bowl rim.

6. The method of claim 5 wherein the additional resin pills are located relatively close to the bowl rim and relatively remote from the countertop corners.

7. The method of claim 5 wherein the outer edge of each side countertop section is spaced a further distance from the bowl rim than the corresponding edge of the front or rear countertop section:
the method further comprising the step of placing an added resin pill on each side countertop section in close proximity to the bowl rim.

References Cited
UNITED STATES PATENTS

| | | | |
|---|---|---|---|
| 3,597,425 | 8/1971 | Shaines | 264—255 |
| 3,309,448 | 3/1967 | Schilling | 264—255 |
| 3,184,527 | 5/1965 | Fischer | 264—255 |
| 3,485,911 | 12/1968 | Reyburn | 264—246 |

ROBERT F. WHITE, Primary Examiner

G. AUVILLE, Assistant Examiner

U.S. Cl. X.R.

264—325